Dec. 8, 1964  J. W. WOODS  3,160,408
AUTOMATIC DOOR CLOSER
Filed Nov. 20, 1961  2 Sheets-Sheet 1

INVENTOR
JOHN W. WOODS

BY

ATTORNEYS

Dec. 8, 1964  J. W. WOODS  3,160,408
AUTOMATIC DOOR CLOSER
Filed Nov. 20, 1961  2 Sheets-Sheet 2

INVENTOR
JOHN W. WOODS

BY

ATTORNEYS

United States Patent Office 3,160,408
Patented Dec. 8, 1964

3,160,408
AUTOMATIC DOOR CLOSER
John W. Woods, Rte. 2, Gettysburg, Pa.
Filed Nov. 20, 1961, Ser. No. 153,279
5 Claims. (Cl. 268—3)

This invention relates to vehicles and more particularly to a door closer which may be remotely controlled by an operator as, for example, the driver of a motor vehicle.

In the operation of motor vehicles of various kinds it is customary for the passengers to enter and leave through doors away from the driver and frequently passengers forget to close the door or close it improperly, including not causing the latches to engage or slamming it too hard. In some instances, as a result of a door being inadequately closed a passenger has fallen out of the vehicle.

Accordingly, it is an object of the present invention to provide a door closer especially adapted for a vehicle such as an automobile and by means of which the door may be closed in response to actuation of a control switch located on the dashboard or other convenient location.

A further object of the invention is the provision of a remotely controlled door closer having instrumentalities for causing the door to securely latch but permitting the door not to completely close in the event that an object interferes with such closing, in order to minimize personal injury or other damage.

A further object of the invention is the provision of a remotely controlled automatic door closer which does not interfere with manual operation of the door when not activated and which is relatively inexpensive and easy to assemble and operate.

Figure 1:
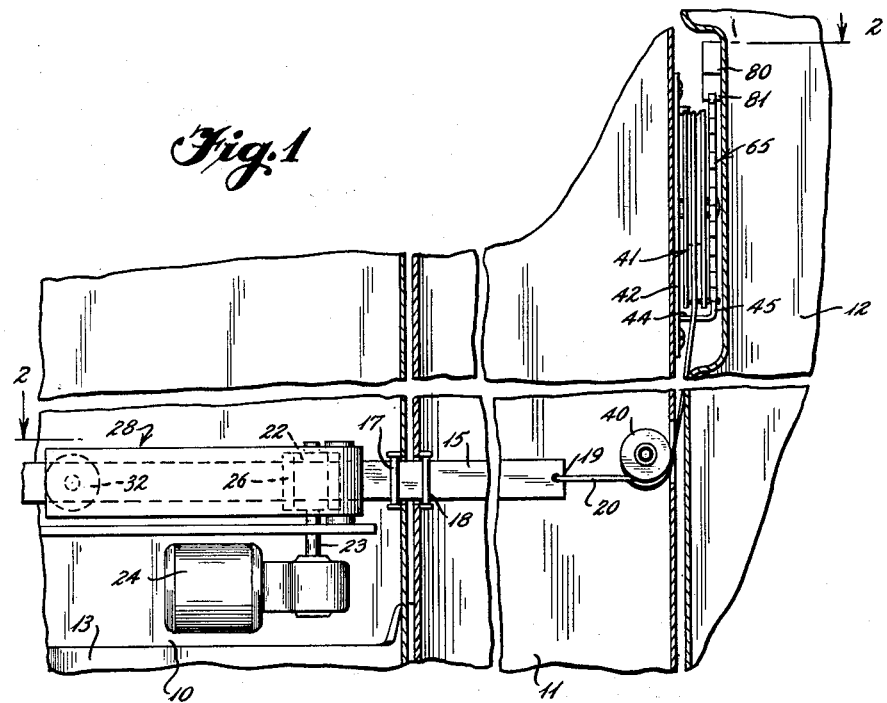
Figure 2:
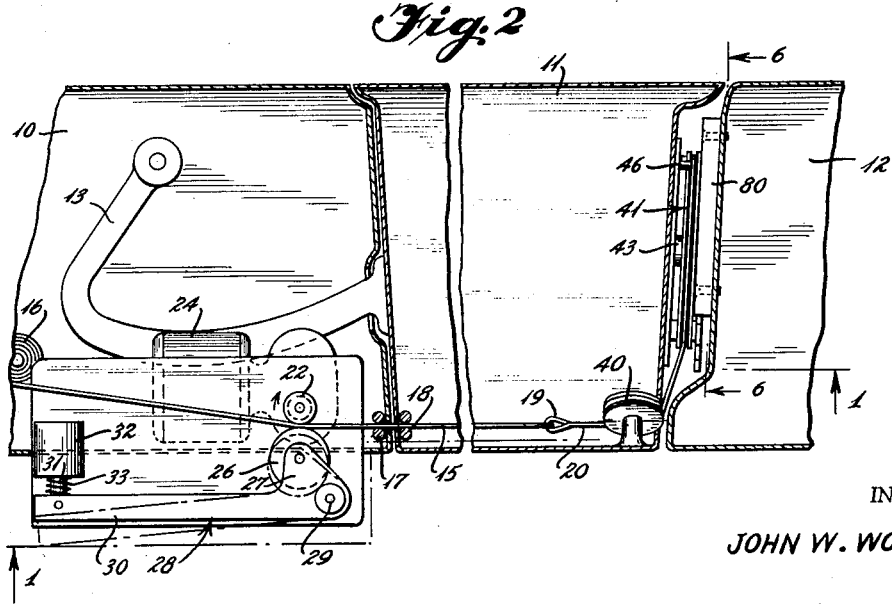
Figure 3:
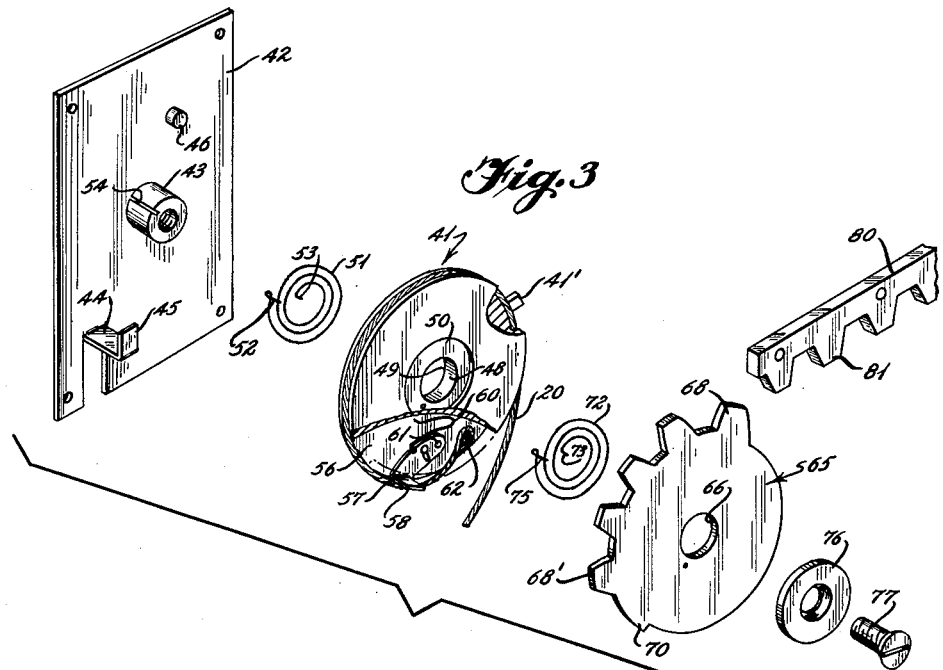
Figure 4:
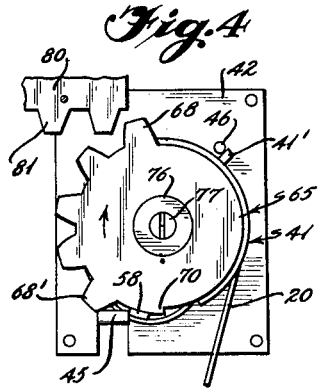
Figure 5:
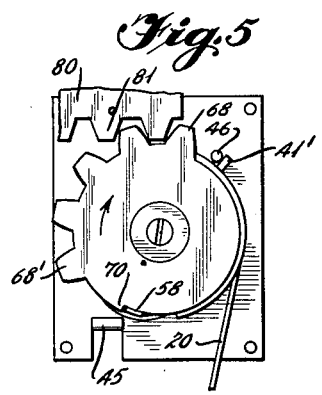
Figure 6:
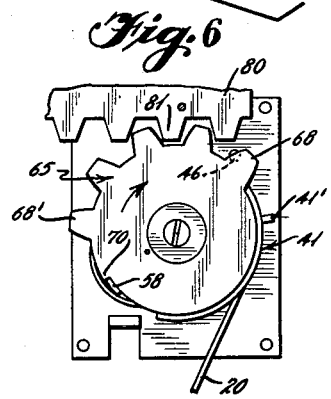
Figure 7:
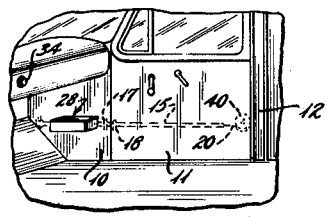

These and other objects of the invention will become apparent from the following description in conjunction with the accompanying drawings in which:

FIG. 1 is a section on the line 1—1 of FIG. 2 illustrating the interior of the body, door and jamb of a vehicle having a door closer in accordance with the present invention mounted therein;

FIG. 2, a section on the line 2—2 of FIG. 1;

FIG. 3, an exploded view of the latching mechanism of the invention;

FIG. 4, a section illustrating the latching mechanism prior to engagement;

FIG. 5, a section similar to FIG. 4 illustrating the latching mechanism immediately after engagement;

FIG. 6, a section similar to FIGS. 4 and 5 on the line 6—6 of FIG. 2 and illustrating the latching mechanism in fully closed position; and FIG. 7, a schematic view illustrating a proposed mounting of the device in a vehicle.

Briefly stated, the invention includes a length of tape carried on a reel in the vehicle and connected to a length of cable on a reel mounted in the door, a tape drive being mounted in the vehicle and the cable reel having a latching mechanism for applying additional closing force and operative in response to actuation by ratchet mechanism mounted in the door jamb.

With further reference to the drawings, there is illustrated a vehicle having a body 10 to which is hinged a door 11 connectable with a jamb 12 by latching mechanism (not shown). As illustrated in FIG. 2, the door swings on a hinge 13 mounted in the body.

In order to automatically close the door, a reeling mechanism is employed. A tape 15 is fed from a conventional windup reel 16 rotatably mounted in the vehicle body and passes between spaced rollers 17 in the body and 18 in the door adjacent to the hinge and is attached to the loop 19 of a cable 20. Intermediate the reel 16 and the rollers 17 the tape passes between a drive roller 22, mounted on shaft 23 driven by electric motor 24, and an idler roller 26. The idler roller is mounted on arm 27 of bellcrank 28 pivotally mounted at 29. The other arm 30 of the bellcrank is engaged by an actuator 31 of a solenoid 32, spring 33 urging the actuator outwardly.

When the solenoid is energized the actuator 31 is drawn into the core to the full-line position in FIG. 2 of the bellcrank in which the idler roller 26 presses tape 15 into engagement with the drive roller 22; in such position operation of the motor draws the tape from right to left as illustrated in FIG. 2.

Motor 24 and solenoid 32 are electrically operated by switch means 34 which may be mounted on the dashboard of the vehicle and through conventional electrical circuits to the battery of the vehicle (not shown). Unless the control button is pushed, spring 33 holds the crank arm in the lower position with rollers 22 and 26 separated. In such position there is no appreciable drag on the tape 15 and it may be easily withdrawn from reel 16. Upon energization of the control circuit the crank arm is raised and the drive roller 22 cooperating with the idler 26 drives the tape in the direction of windup reel 16.

From the loop 19 the cable 20 passes over a sheave 40 mounted in the door adjacent to its latching edge and then over a latching sheave 41 rotatably mounted on the edge of the door.

Sheave 41 is mounted on a base plate 42 having a spindle 43 and a stop arm 44 with a transverse stop portion 45, and a pulley return stop 46.

The sheave 41 has a bore 48 and countersunk recesses 49, 50 on its inner and outer faces. Mounted within recess 49 is a coil spring 51 having an outer end 52 fixed in recess 49 and an inner end 53 fixed in the opening 54 of the spindle 43.

The sheave 41 has an internal recess 56 within which a detent 57 is mounted. The detent has a transverse operating foot 58 and is normally urged outwardly by spring 60, the detent being pivotally mounted on pin 61. Cable 20 passes around the sheave 41 and its end is secured to a pin 62 mounted in recess 56. The cable wraps over one side of the detent foot portion 58 and tends to raise the detent against the urging of the spring 60 when the cable is under tension.

Mounted adjacent to the sheave 41 on the opposite side from the plate 42 is a sprocket 65. The sprocket has a bore 66 for mounting it on the spindle 43, and has a plurality of teeth 68 on one sector. Adjacent to an end tooth 68′ the sprocket is shaped to provide a cam 70. Coil spring 72 is mounted in the recess 50 of the sheave 41 and its ends 73, 75 are fixed in the spindle and the sprocket, respectively. In order to hold the assembly together, a retaining washer 76 and screw 77 are provided, the screw engaging internal threads in the spindle 43.

Fixedly mounted in the door jamb at an appropriate position for engagement by the teeth of the sprocket 65 when the door is substantially closed is a rack 80 having teeth 81 thereon.

Sheave 41 has a return positioning lug 41' mounted on its periphery in a position to engage the stop 46 when the detent foot 58 is in position to engage stop 45 of the base plate.

Prior to operation of the device, the cable 20 is wound about the sheave 41 but is not under tension. Under such condition spring 51 rotates the sheave counterclockwise to the position of FIG. 4 in which lug 41' engages stop 46, and sprocket 65 is rotated counterclockwise by spring 72 until tooth 68' engages stop arm 44. In such position detent 57 is urged outwardly by spring 60 until detent foot 58 is positioned behind stop 45. Cam 70 on the sprocket is positioned over the detent foot, the sprocket spring 72 tending to maintain the sprocket in such angular position relative to the sheave 41.

When the door is opened, the electrical circuit not being energized, free withdrawal of the tape from the reel 16 is permitted.

Assuming that the door is open and that the operator desires to close it, he presses the control switch 34, thus energizing the solenoid and motor and retracting the tape and attached cable as previously described. This causes the door to swing toward a closed position. Despite the tensioning of the cable tending to lift the detent 57, the detent foot 58 is held by cam 70 behind the transverse stop portion 45 of the stop and prevented from lifting, thereby preventing relative movement of the sheave 41 and base plate 42.

As the sprocket engages the first tooth 81 of the rack 80 just past the position indicated in FIG. 4, such engagement initially rotates the sprocket clockwise overcoming spring 72 and such rotation causes the cam 70 to clear or move past the detent 58 which has previously been held outwardly by the cam 70. Upon the release of the detent 58, it is moved inwardly by the cable under tension into the space behind cam 70. Being released, the sheave 41 is free to turn on the spindle 43 and to exert torque on the sprocket 65 through detent foot 58 acting against the back of cam 70 to assist in closing the door. Hence, the retraction of the tape and cable not only tends to pull the door closed, but upon the release of the latch 58, to rotate the sheave and sprocket, the latter engaging the teeth of the rack 80 to urge the door into fully closed position.

When the control switch is released the tension on the tape and cable is released, thus permitting the pulley return spring 51 to rotate the pulley counterclockwise until the lug 41' rests against the stop 46. At this position, since the cable is not under tension, the spring 60 urges the detent 57 outwardly behind the stop 45 on the plate 42.

When the door is opened the sprocket is rotated counterclockwise to the position indicated in FIG. 4 with its tooth 68' engaging the stop 44.

The tape idler pulley 26 is adjusted so that there is little or no slippage between the rollers 22, 26 during retraction of the sheave but to permit slippage if an object should interfere with closing of the door or if the motor and solenoid should be energized after the door is closed.

Although the invention has been described for use in operating a vehicle door, it obviously may be used for other purposes, including the operation of doors in various vehicles and movement of hinged parts.

Accordingly, it will be understood that the invention includes a motor operated tape drive connected to a cable operating over a latchable sheave adapted to drive a sprocket and in which the sprocket has a latch release operated by motion of the door toward closed position, the sprocket then being driven by the sheave to assist in closing the door.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for closing an automobile door against a jamb comprising a rack on said jamb, a tape located within said automobile, means for driving said tape in one direction, a cable connected at one end to one end of said tape, a plate having a stop and a latch bar fixed to the edge of the door adjacent to the jamb, a sheave rotatably mounted on said plate and having a lug engageable with said stop, a first spring means connecting said sheave and said plate and adapted to urge said sheave lug against said stop, latch means pivotally mounted in said sheave and having a detent foot extending outwardly of said sheave, a sprocket mounted on said plate and located adjacent to said sheave, cam means on said sprocket, a second spring means connecting said sheave and said sprocket for urging said sprocket into a position so that said cam means will prevent the withdrawal of said detent foot, the end of said cable being connected to said sheave in a manner such that the cable passes over said detent foot whereby when said door is open and said tape is driven in said one direction the slack in said cable will be taken up while the sheave is substantially in fixed position until the sprocket engages the rack on said door and the sprocket is rotated by said rack to release the detent foot from the cam surface of the sprocket thereby permitting rotation of said sheave and permitting said sheave to drive said sprocket to final closed position of the door.

2. The structure of claim 1 in which said means for driving said tape in one direction includes a motor operated roller, an idler roller mounted on a crank arm, and solenoid means for urging the idler roller toward engagement with the motor operated roller with the tape therebetween whereby force will be applied to said tape to close said door while permitting slippage in case of an obstruction.

3. Apparatus for closing a door connectable with a jamb comprising a tape, means for driving said tape in one direction, a cable connected at one end to one end of said tape, a plate having a spindle mounted on said door, a sheave rotatably mounted on said spindle and having means for stopping rotation of said sheave in one direction, a detent pivotally mounted on said sheave, said detent having a foot extending substantially at right angles thereto, sprocket means rotatably mounted on said spindle, cam means on said sprocket means normally engageable with said detent foot, said cable being connected to said sprocket and extending over said detent foot, rack means mounted on said jamb whereby when said door is open and said means for driving said tape is energized the slack in said cable will be taken up and the door will be moved towards closed position until the sprocket engages said rack to rotate said sprocket and release said detent foot from said cam thereby permitting rotation of said sheave and permitting the detent foot to drive the sprocket against the rack to urge the door into fully closed position.

4. Apparatus for closing a door cooperating with a jamb comprising a sheave assembly mounted on said door, said sheave assembly including a spindle, a sheave rotatably mounted on said spindle, means for limiting the rotation of said sheave in one direction, latch means pivotally mounted on said sheave, sprocket means rotatably mounted on said spindle and located adjacent to said sheave, cam means on said sprocket means, said latch means normally engaging said cam means, cable means attached to said sprocket in a manner to overlie said latch means, means for driving said cable, rack means on said jamb located in a position to engage said sprocket means whereby when said cable is driven said door will be moved toward closed position until said sprocket means engages said rack means and rotates said sprocket means to release said latch means from the cam means and permit said sheave to drive said sprocket means to a final closed position of the door.

5. The structure of claim 4 in which said means for driving said cable includes a fixed driven roller, a movable idler roller, and means for urging said idler roller toward engagement with the driven roller with said cable means therebetween whereby force will be applied to said cable means to close said door while permitting slippage in case of an obstruction.

References Cited by the Examiner

UNITED STATES PATENTS

| | | | |
|---|---|---|---|
| 866,070 | 9/07 | Rosenhein | 268—113 |
| 1,151,479 | 8/15 | Kurtz | 268—3 |
| 2,237,576 | 4/41 | Rakoczy | 268—3 |
| 2,770,454 | 11/56 | Turtle. | |

HARRISON R. MOSELEY, *Primary Examiner.*

J. SCHNALL, *Examiner.*